US010890771B2

(12) United States Patent
Greenberg (10) Patent No.: US 10,890,771 B2
(45) Date of Patent: Jan. 12, 2021

(54) DISPLAY SYSTEM WITH VIDEO SEE-THROUGH

(71) Applicant: EYEWAY VISION LTD., Or Yehuda (IL)

(72) Inventor: Boris Greenberg, Tel Aviv (IL)

(73) Assignee: EYEWAY VISION LTD., Or Yehuda (IL)

( * ) Notice: Subject to any disclaimer, the term of this patent is extended or adjusted under 35 U.S.C. 154(b) by 0 days.

(21) Appl. No.: 16/489,056

(22) PCT Filed: Feb. 28, 2018

(86) PCT No.: PCT/IL2018/050222
§ 371 (c)(1),
(2) Date: Aug. 27, 2019

(87) PCT Pub. No.: WO2018/158765
PCT Pub. Date: Sep. 7, 2018

(65) Prior Publication Data
US 2020/0012107 A1    Jan. 9, 2020

(30) Foreign Application Priority Data

Mar. 1, 2017 (IL) .......................................... 250869

(51) Int. Cl.
*H04N 1/00* (2006.01)
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0138* (2013.01);
(Continued)

(58) Field of Classification Search
CPC .......... G02B 27/01; G02B 27/28; G06T 19/00
See application file for complete search history.

(56) References Cited

U.S. PATENT DOCUMENTS 7,522,344 B1    4/2009   Curatu et al.
7,639,208 B1   12/2009   Ha et al.
(Continued)

OTHER PUBLICATIONS

International Search Report for PCT/IL2018/050222, dated May 31, 2018.

*Primary Examiner* — Michael A Faragalla
(74) *Attorney, Agent, or Firm* — Dorsey & Whitney LLP (57) ABSTRACT

A display system with video see-through eye display unit is disclosed. The eye display unit includes: at least one camera unit; at least one image forming module; and an optical deflection module including at least one double sided light reflecting optical element which is at least partially reflecting to light arriving from both sides thereof. The camera unit is configured for collecting light arriving from a region of interest of a scene along a first optical path intersecting the optical deflection module, and generating image data indicative of the region of interest. The image forming module is configured for receiving imagery data indicative of images to be projected to an eye of a user, and generating and projecting the received images to propagate along a second optical path intersecting the optical deflection module. The double sided light reflecting optical element of the optical deflection module is arranged in the display system to be located in front of the eye while intersecting the first and second optical paths, and is oriented to define the first optical path (between the camera unit and the scene) and the second optical path (between the image forming unit and the eye), such that the camera unit has a point of view substantially similar to line of sight of the eye.

17 Claims, 6 Drawing Sheets

(52) U.S. Cl.
CPC ............... *G02B 2027/0145* (2013.01); *G02B 2027/0174* (2013.01)

(56) References Cited

U.S. PATENT DOCUMENTS

| | | |
|---|---|---|
| 9,195,067 B1 | 11/2015 | Heinrich et al. |
| 2009/0190003 A1 | 7/2009 | Park et al. |
| 2014/0300632 A1* | 10/2014 | Laor .................... G02B 27/017 345/633 |
| 2017/0010467 A1 | 1/2017 | Ellsworth |
| 2017/0052369 A1* | 2/2017 | Shimatani .......... G02B 27/0101 |

* cited by examiner

DISPLAY SYSTEM WITH VIDEO SEE-THROUGH

TECHNOLOGICAL FIELD

The invention relates to configuration of a head mount display system and is particularly relevant to head mounted display systems with see through and video see through configurations.

BACKGROUND

Video See Through Augmented reality systems, differently from virtual reality systems, base display data on appearance of actual scenes in front of the user. Generally, input image stream of a scene is captured and a layer of augmentation data is added on the captured image data and displayed to the user. This allows providing layers of information onto real-world images, integrating gaming and other experiences into the surroundings and other real-word based visualizations.

Such Augmented reality system are generally based on one of two main integration schemes, the user may be able to observe an actual scene looking through a partially transparent display/window, and the augmentation data is displayed thereon. In an alternative scheme, the actual scene is acquired with video capturing device (camera) and is displayed to the user together with augmentation data on a display device. Typically, augmented reality systems of the later type are configured as hand held systems such as tablet computer or smartphone-like device, using a camera unit for providing data about the actual scene and moved by the user to vary point of view thereof. Some augmented reality systems are configured to be wearable and include mounted one or two cameras. Typically, in the conventional wearable systems, the one or two cameras are generally mounted with a line of sight different than the user's eye and utilize horizontal, lateral, and/or longitudinal (along the Z-axis stretching between the user and the scene) shift. Other configurations utilize a single camera for video acquisition providing a 'cyclopean' eye solution, which on one hand reduces the amount of pixels to be processed, and on the other hand provides limited or no stereoscopic que for the user.

Conventional head mounted systems configured to provide augmented reality typically provide relatively simple augmentation data and utilize at least partially transparent element for display, while allowing the user to observe the actual scene. For example, U.S. Pat. No. 9,195,067 describes an electronic device includes a display and a band configured to be worn on the head of a user. The band defines a display end to which the display is affixed and extends from the display end to a free end. The band is adjustable such that it can be configured by a user to contact the head of the user at a first location near a temple, a second location along a portion of the user's ear adjacent the temple, and at a third location along a rear portion of the head of the user. The display end is positionable away from the head such that the display element is suspended over an eye adjacent the temple. The band is further configured to maintain the configuration. The device also includes image generating means within the band for generating an image presentable to the user on the display.

GENERAL DESCRIPTION

There is a need in the art for a novel system configuration capable of providing display of visual augmentation data combined with view of an actual scene to a user. The technique of the invention provides a display system, typically configured to be head mounted, having one or two eye display units for providing a user with display data. The system is generally configured to provide virtual or augmented reality experience to the user by displaying image data with a relatively large field of view and is configured to incorporate actual visual data of a region in front of the user (actual scene) in the display data in substantially real time fashion.

Each of the eye display units is associated with at least one camera unit and comprises at least one image forming module (e.g. display and/or projection unit) and an optical deflection module. The optical deflection module is generally located in front of the corresponding eye of the user (e.g. in-front of a predefined eye-box location of the system) and is configured to direct light arriving from a scene located in front of the user to be collected by the at least one associates camera unit and to direct light arriving from the at least one image forming module to the user's eye. This configuration allows the camera unit(s) to be located such that the field of view of the camera is substantially similar to that of the user's eye, thus preventing various disorientation issues associated with changes in point of view of the camera with respect to the user's eye.

More specifically, according to the technique of the invention, the input image data collected by the camera unit is collected from a point of view substantially similar to that of the user's eye without a use of the system. Typically, collected image data is transmitted to a control unit for processing and generating display data, which is provided to the user via the image forming module. Thus, the control unit utilizes input image data that corresponds to line of sight as expected by the user. In accordance with the input image data, location of objects and point of view of the user with respect to displayed data is generally similar to location and point of view as expected by the user in the real world. This provides the user with ability to orient himself in space better, as head movements result with variation of the collected (and thus displayed) images in a manner that is similar to what the user expects.

In addition to improving user's orientation in space, the system configuration may also enhance user's ability to interact with real objects in augmented reality. More specifically, the control unit may be operable to added image data layers in accordance with certain objects located in the actual scene, as the object in the input image data is substantially similar to what the user expects and how the user sees the object, the additional data layers can behave in a more physically authentic manner. This is in particular useful for video see-through systems in which while using the head mount display system, users may still observe real objects in their actual location and interact with them. This is contrary to conventional systems where there is a difference between point of view of camera collecting image data for augmentation, and the location of the user's eyes (corresponding to expected point of view of the user.

It should be noted that the system configuration and the technique of the invention providing enhanced user orientation in the real as well as augmented environment are specifically important for applications requiring user interaction with real objects while being experiencing augmentation of the actual scene. In such applications, user's interaction with objects located at close proximity to the user (e.g. between a few centimeters and 1 or 2 meters) level of space orientation of the user determines accuracy of hand movement.

To this end, the technique of the invention utilizes an optical deflection module, located in front of the user's eyes when the system is used. The optical deflection module is located such the light arriving from a scene in a path that would reach the user's eye (had the user would not use the system) is deflected along a camera axis and directed towards at least one associated camera unit. Additionally, the optical deflection module directs towards the user's eye, light arriving from at least one image forming unit position in a corresponding location.

Thus, according to one broad aspect, the present invention provides a system comprising an eye display unit comprising:

at least one camera unit configured for collecting light arriving along a first optical path from a region of interest of a scene and generating image data indicative thereof;

at least one image forming configured for receiving imagery data and projecting images of said imagery data along a second optical path towards an eye of a user; and an optical deflection module comprising at least one double sided light reflecting optical element configured to be at least partially reflecting to light arriving from both sides thereof, and located in front of said eye intersecting said first and second optical paths, and oriented to define said second optical path between the image forming unit and the user's eye, and define said first optical path between said at least one camera unit and the scene; thereby providing said at least one camera unit has a point of view substantially similar to line of sight of the user's eye.

According to some embodiments, the at least one camera unit may be located along said first optical path at an optical plane corresponding to the optical plane of said user eye relative to the scene in the absence of said optical deflection module. Additionally or alternatively, the at least one camera may be located along said first optical path and configured to provide line of sight substantially similar to line of sight of the corresponding user's eye.

According to some embodiments, the at least one image forming unit may comprise an eye projection unit configured for projecting structured light indicative of one or more images onto the user's corresponding eye.

The at least one image forming unit may comprise an image display unit configured for providing displayed image data.

According to some embodiments, the at least one double sided light reflecting optical element of the optical deflection module may be configured as a two sided mirror.

According to some embodiments, the system may comprise first and second eye display units corresponding with right and left eyes of a user.

Generally, the eye display unit may further comprise a control unit, said control unit is configured and operable for receiving image data collected by the at least one camera unit and generating corresponding display image data and transmitting said display image data to the at least one image forming unit for providing corresponding imagery to the user.

According to some embodiments, the optical deflection module may be configured to direct input light such that optical location and line of sight of the at least one camera unit corresponding with optical location and line of sight of the corresponding eye of the user.

The optical deflection unit may be configured to provide location of said at least one camera unit being at an eye equivalent location.

According to some embodiments, the at least one display unit may be configured to provide seamless image display.

According to some embodiments, the optical deflection module may comprise at least one reflecting surface configured to provide selected optical manipulation to light reflected therefrom.

According to some embodiments, the at least one reflecting surface may be configured with at least one of the following: selected surface curvature, diffractive grating, and holographic element.

According to some embodiments, the optical deflection module is configured and arranged in the system, such that a part of the first optical path along which light arriving from the scene is being deflected towards the camera unit is co-aligned with a part of the second optical path along which light projected by the image forming unit is being deflected by the optical deflection module to propagate to the eye; thereby providing that images portions of the scene, which are captured by the camera unit and are projected to the eye by the image forming unit, are being projected with spatial registration relative to the external scene.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

As indicated above, head mounted virtual and/or augmented reality systems provide users with active experience and enable them to play a part in virtual or augmented world. While in the complete virtual experience, the interactions with real world objects is limited and may often serve as metaphors for something else in the virtual world, augmented reality experience relays on interaction with real scenes and objects that are relevant to the location and surrounding of the user.

In order to allow user to actively interact with actual objects, while using head mounted augmented reality system, space orientation of the user need to be adjusted to the data displayed by the system. However, as the system generally utilizes input image data of the surrounding that is collected by one or more camera units, and at times provide the user with display data obtained by the one or more camera units, location and point of view of the camera units may greatly affect the user's orientation in space. This is mostly noted as the location and distance of objects might seem to be different than the actual location and distance.

Figure 1:
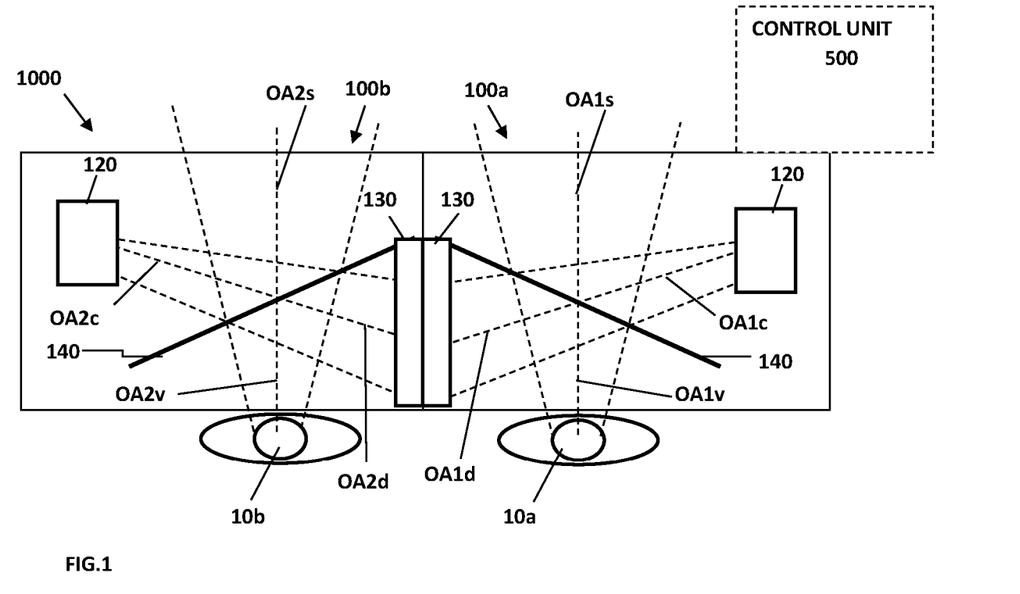
FIG. 1 schematically illustrates display system configuration and operation principles of the present invention.

To this end, the present invention provide a display system, generally configured to be head mounted display system, configured to collect input image data of a scene with a point of view that is substantially similar to point of view of the user's eyes when not using the system. Reference is made to FIG. 1 schematically illustrating a display system 1000, generally including two eye display units 100a and 100b, and configured to provide displayed image data corresponding to line of sight and point of view as expected by the user. Each of the eye display units 100a and 100b includes an image forming module 130 configured for forming image data that can be collected by the user's eyes 10a and 10b in the form of image stream, and is associated with at least one camera unit 120 configured for collecting input image data. Additionally, according to the present invention, each eye display units 100a or 100b includes an optical deflection module 140 configured to direct at least a portion of light arriving from a scene in front of the user towards the corresponding camera unit 120, and for directing light from the image forming unit 130 to the user's corresponding eye 10a or 10b. The optical deflection module 140 may generally include a flat plate configured to be at least partially reflecting on both sides thereof. Additionally or alternatively, one or more surfaces of the optical deflection module 140 may have one or more curved surfaces and/or utilize diffractive and/or holographic surface regions. Thus the optical deflection module 140 may be configured to provide optical manipulations for improved imaging by the image forming unit 130 or image acquisition by the camera unit 120. As exemplified in the figure, the optical deflection modules 140 are configured to deflect optical axis (OA1c and OA2c) of the corresponding camera unit 120 towards a first optical path aligned with main optical path OA1s and OA2s of the user's eyes 10a and 10b. Generally the optical deflection modules 140 may each include at least one double sided light reflecting optical element. Additionally, the optical deflection module is configured to deflect light generated (OA1d and OA2d) by the image forming module 130 along second optical path aligned with optical axis (OA1v and OA2v) of the user's eyes. Operation of the optical deflection module provides that is case the image forming modules 130 are directly connected to the corresponding camera unit 120, the images displayed to the user is substantially seamless as if the system is not in use, thus providing seamless display of the scene.

More specifically, angular orientation of the optical deflection module 140 and location of the camera unit 120, including any optical element located in optical path of light collected by the camera unit 120, provides that the camera unit is located at an eye equivalent optical plane. Thus, the camera unit has a line of sight substantially similar to that is would have if located at the location of the eye and directed forward.

Generally, the system 1000 also includes, or is connectable to a control unit 500 configure for receiving input image data from the camera units 120, processing the input data and generating output data for display by the image forming modules 130. The control unit 500 may also be configured for generating audible data (e.g. sound effects) to be provided to the user via corresponding headphones or speakers, and may have connectivity to a communication network or various other devices as the case may be. Generally the control unit 500 may utilize the input image data for determining a three-dimensional model of the surrounding and locate virtual objects in accordance with the determined three-dimensional model. It should be noted that as the input image data is collected from a point of view that is substantially similar to that of the user, registration of virtual objects in augmented reality may generally provide a reliable experience where objects are located in correct and believable locations and distances and solves various glitches of virtual objects that seems to be floating or located within other real objects.

It should be noted that the according to some embodiments, each eye display unit 100 may include a corresponding camera unit. Alternatively, the two eye display units may be associated with a common camera unit using a portion of its field of view for capturing image data corresponding to the right eye and another portion of its field for capturing image data corresponding to the left eye of the user. For simplicity, the technique of the invention is herein described as using camera unit for an eye display unit. Moreover, due to the symmetry between right and left eyes, the present invention is herein described with respect to one eye. Generally in some configurations, the system may only include a single eye display unit, while the other eye of the user is free to view the surroundings without any interruptions.

Figure 2A:
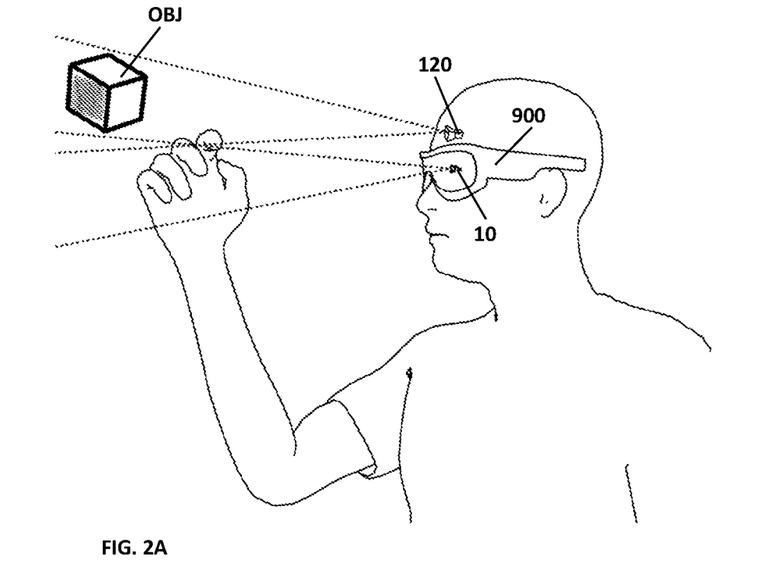
FIGS. 2A and 2B illustrate user interaction with virtual object in augmented reality where the system utilizes camera unit with shifted line of sight (FIG. 2A) and common line of sight according to the present invention (FIG. 2B)
Figure 2B:
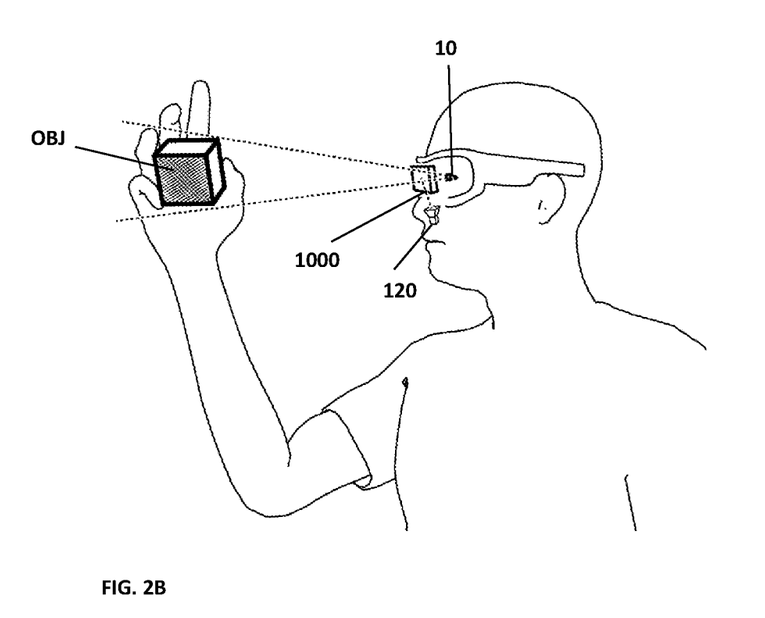

Reference is made to FIGS. 2A and 2B exemplifying user interaction with virtual objects in augmented reality environment where the input image data of the surrounding (actual scene/reality) is provided by a camera unit being shifted with respect to the user's line of sight (FIG. 2A) and by a camera unit having common line of sight with the user (FIG. 2B). FIG. 2A shows a user wearing an augmented reality unit in the form of glasses with display 900. The augmented reality unit 900 also includes a camera unit 120 configured for collecting image data of the surrounding, which is used to determine location of displayed virtual objects (e.g. object OBJ) with respect to the actual scene surrounding the user. Typically, the processing/control utility (not specifically shown here) of the system 900 utilizes the input image data to determine locations of displayed objects. As the line of sight of the camera unit 120 is shifted with respect to line of sight of the user's eyes 10, displayed location of the object may be shifted with respect to the actual scene. Such shifts may cause user disorientation when trying to form interaction with both physical and virtual objects and when a virtual object is presented on similar location as a selected physical object.

The illustration of FIG. 2B exemplifies an augmented reality system 1000 configured according to the technique of the present invention. More specifically, the system include a camera unit 120 configured to have light of sight substantially similar to that of the user's eyes 10. This configuration provides the processing/control utility (not specifically shown) with input image data as seen from the point of view of the user. The control utility can thus determine location of displayed virtual objects (e.g. object OBJ) relative to the physical scene in a way that simplify user orientation in space and interaction with such objects.

Generally, for objects that are relatively distant from the user, small variations in the line of sight may be negligible. However, as many augmented reality application may be used to promote user interaction with displayed objects, the objects may be displayed to appear at distances of centimeters to about 1.5 meters from the user, i.e. at hands' reach. For such relatively short distances, line of sight variation of even a few centimeters may result is meaningful shifts and cause user disorientation when trying to generate interaction with displayed virtual objects.

Figure 3:
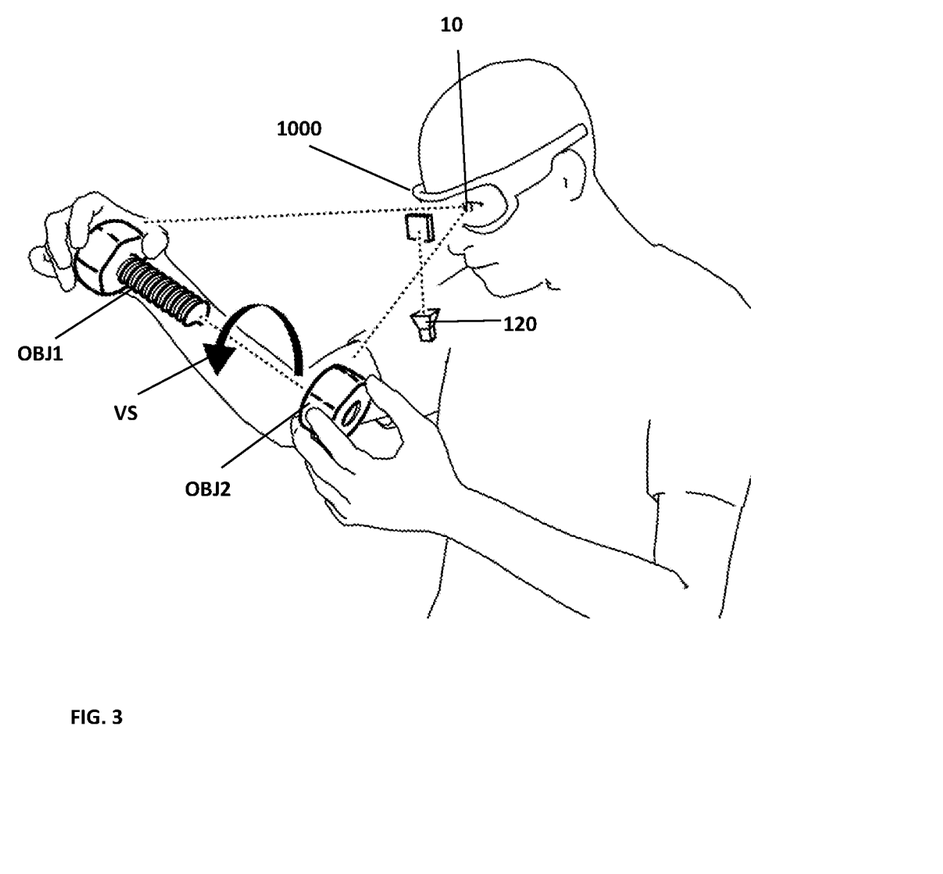
FIG. 3 illustrates user interaction with physical objects in combination with assisting data layer provided by Augmented reality system indicating possible use of video see-through system according to some embodiments of the invention.

An exemplary use of video see through configuration is illustrated in FIG. 3. As shown in FIG. 3 a user may receive visual guidance and/or manual instructions while operating and performing actual physical tasks utilizing an augmented reality system 1000 according to some embodiments of the invention. In this example, the user is trying to assemble two objects OBJ1 and OBJ2 while the system 1000 provides an additional instruction data layer VS that is visible around the objects and provides instruction of how to perform the task. It should be noted that the location of the actual objects OBJ1 and OBJ2 as displayed to the user should comply with the actual location of the objects in space (associated also with the user's hands) the instructions (augmentation) data VS should be visible at a corresponding location in order to be meaningful to the user. More specifically, if the augmentation data VS in this example appears next to OBJ1 the task may be understood unscrewing OBJ1 from OBJ2, while if the augmentation data VS appears next to OBJ2 the resulting task may be understood as the opposite (screwing OBJ1 and OBJ2 together).

Figure 4:
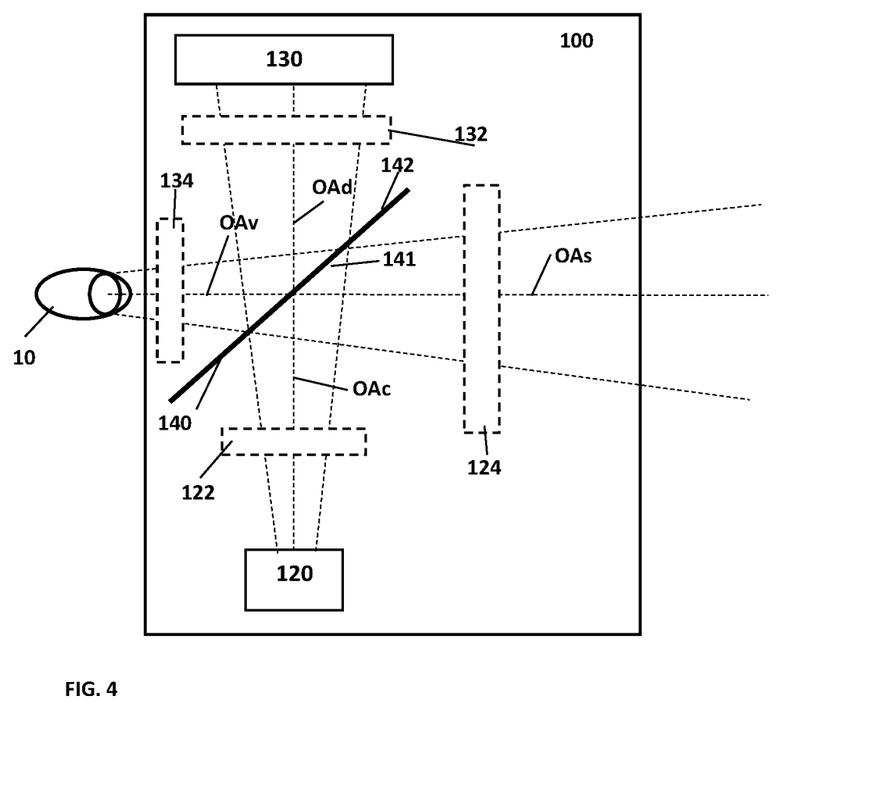
FIG. 4 illustrates an eye display unit in accordance with some embodiments of the present invention.

References is made to FIG. 4 schematically illustrating an eye display unit 100 according to some embodiments of the invention. The eye display unit 100 include an image forming unit 130, a camera unit 120 and an optical deflection module 140. The optical deflection module 140 may be a double side at least partially reflecting plate, e.g. double side mirror, configured to deflect light arriving from a scene in front of the user to be captured by the camera unit 120 and light arriving from the image forming unit 130 towards the user's eye 10. The optical deflection module 140 typically has two at least partially reflecting surfaces, surface 141 at the surrounding and camera unit 120 side and surface 142 at the eye and image forming unit 130 side, and is positioned at an angled orientation to reflect light arriving from the surroundings towards the camera 120 and light arriving from the image forming unit 130 to the user's eye 10.

More specifically, the optical deflection module 140 as well as the camera unit 120 are positions and oriented such that optical axis of the camera unit OAc is deflected by surface 141 along a first axis aligned with expected line of sight of the user OAs when gazing directly forwards. To provide desired field of view, one or more optical elements are provided in optical path of light collected by the camera unit 120, two such optical elements 122 and 124 are exemplified in the figure. These optical elements may include one or more lenses, apertures or any other element configured for improving image collection and provide desired field of view. The optical elements may be located along optical path OAc between the camera unit 120 and the optical deflection module 140, as well as along optical path OAs between the optical deflection module 140 and the scene in from of the user. In some configurations, as will be described further below, the eye display unit 100 may utilize optical elements located only between the camera unit 120 and the optical deflection module 140. Optical elements 122 and/or 124 may be configured, separately or together to provide desired optical manipulation to collected input light. For example the optical elements may be configured as zoom lenses, telephoto lens system, eye piece units etc. Additionally, as indicated above, surface 141 of the optical deflection module 140 may also be configured to apply desired optical manipulation, utilizing appropriate curvature, diffraction or holographic element etc. in addition or as an alternative to optical elements 122 and 124.

Surface 142 of the optical deflection module 140, generally deflected light arriving from the image forming unit 130 towards the user's eye 10. As shown, the image forming unit 130 is positioned such that optical axis thereof. OAd id deflected along a second optical path to align along an optical axis of the user's eye OAv. The image forming unit 130 may be any type of image forming unit capable of generating output light forming image that can be perceived by the user. For example, the image forming unit 130 may include a display unit having a display panel configured for forming image data by selectively turning a plurality of pixels ON and OFF, or include an eye projections unit configured for projecting selected image data directly onto the user's eye or onto an intermediate image plane.

Further, the second optical path may also include one or more optical elements configured for imaging displayed data to the user. Two such optical elements are exemplified as 132 and 134 located respectively between the image forming unit 130 and the optical deflection module 140 and between the optical deflection module 140 and the user's eye 10. The optical elements may be used to affect light propagation from the image forming unit 130 towards the user's eye 10 to provide desired focusing distance. Also, as indicated above, surface 142 of the optical deflection module 140 may also be configured to apply desired optical manipulation, utilizing appropriate curvature, diffraction or holographic element etc. in addition or as an alternative to optical elements 132 and 134.

Thus, according to various embodiments of the present invention, the optical deflection module 140 (and its deflections surfaces 141 and 142) is configured and arranged in the system 100 such that the nominal optical path OAs (which is the part of the first optical path from/along which light arriving from the scene is deflected by the optical deflection module 140 (e.g. by surface 141) to be captured by the camera unit 120), is co-aligned (coaxial) with the nominal optical path OAv (which is the part of the second optical path along which light projected by the image forming unit 130 is being deflected by the optical deflection module 140 (e.g. by the opposite surface 142) to propagate to the eye 10. Accordingly, images of the scene, or portions thereof, which are captured by the camera unit 120 and projected to the eye by the image forming unit 130 are perceived with spatial registration relative to the external scene.

It should also be noted that the optical deflection module 140 may be configured to be partially reflecting and allow light arriving from the scene to propagate towards the user's eye 10 along optical path OAs and OAv. In such configurations, optical elements 124 and 134 may be configured as two sections of an eye piece, enabling the user to see the surrounding, or may not be used. In such configurations, the scene may be directly visible to the user, without being processed by the control unit, while additional image layers may be provided by the image forming unit 130 on top of the actual visible scene.

Figure 5:
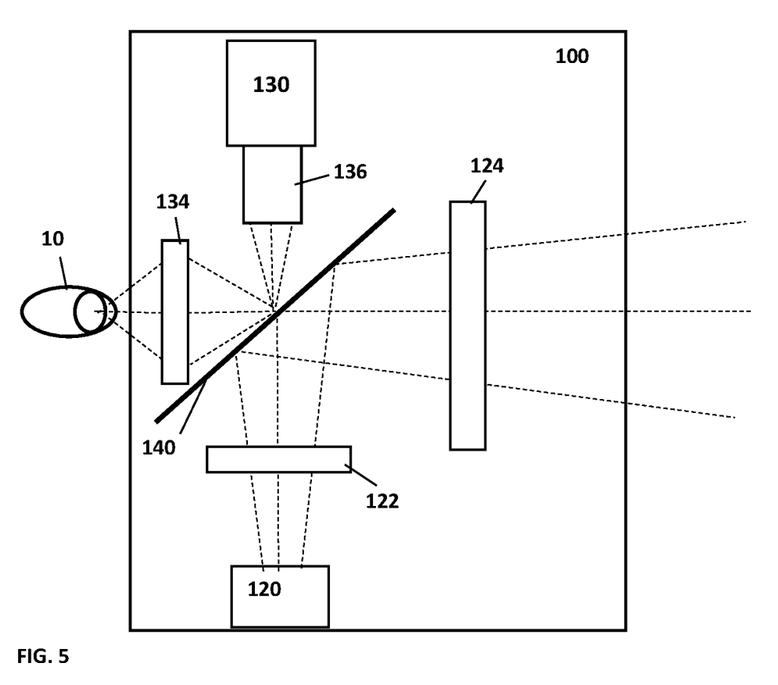
FIG. 5 exemplifies an eye display unit utilizing eye projection unit in accordance with some embodiments of the invention.

Reference is made to FIG. 5 illustrating an eye display unit 100 according to some embodiments of the invention. In this example, the optical deflection module 140 is configured as a double side mirror reflecting practically 100% (e.g. almost 100%, typically about 95%-99%) of light impinging thereon from either side. The image forming unit 130 is configured as an eye projection unit including first relay module 136 and optical element 134 is configured as a second relay module. The eye projection unit may include an eye tracker and may be capable of varying angular orientation of image projection in accordance with movements of the user's eye.

Further, in the configuration exemplified in FIG. 5, the camera unit may include optical element 122 and 124, providing desired field of view. Generally the camera unit may utilize any selected configuration of optical elements enabling desired, and possibly changeable, field of view while providing line of sight corresponding to the user's eye 10. It should be noted that the camera unit 120 may utilize deflecting optical element for varying line of sight thereof in accordance with data about eye orientation provided by the eye tracker of the projection unit if used.

Figure 6:
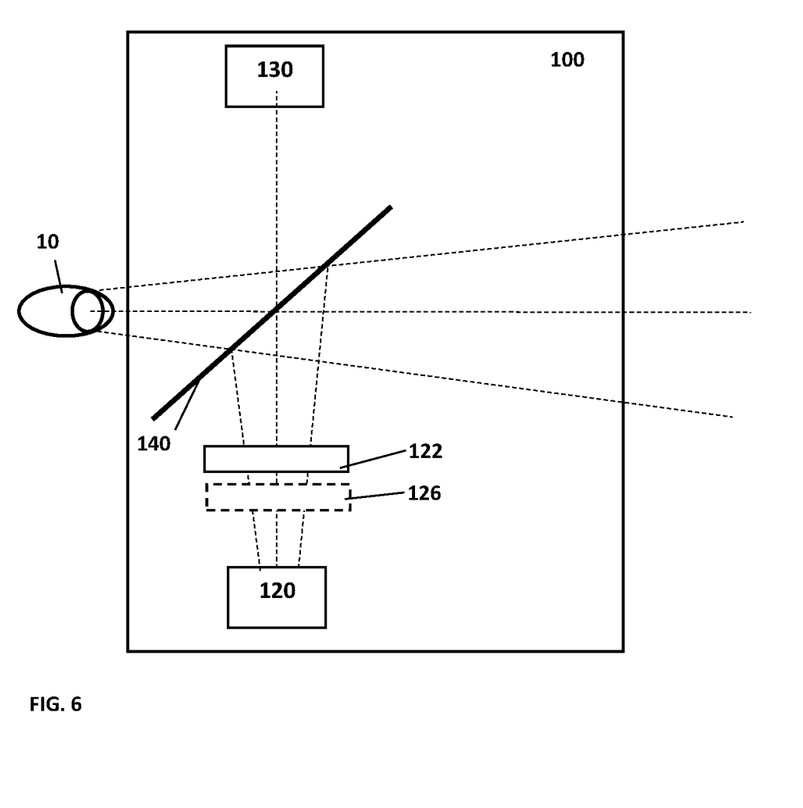
FIG. 6 exemplifies another configuration of eye display unit according to some embodiments of the invention.

FIG. 6 exemplifies an additional configuration of an eye display unit 100 according to some embodiments of the invention. In this configuration the camera unit 120 is provided with optical element 122 located in optical path of collected light between the optical deflection module 140 and the camera unit 120. Additional optical element 126 may be used, located between optical element 122 and the camera unit. Illustrational details of the image forming unit 130 are omitted, as the image forming module may be configured in accordance with the above described configurations.

Generally, in accordance with various embodiments of the present invention as described above, the input image data provided by at least one camera unit 120 of each eye display unit 100, provides stereoscopic input image data. A control unit (generally 500 in FIG. 1), being a part of the display system of connectable thereto, may utilize the input data to determined three dimensional mapping of the surroundings as indicated above. This enables that system to provide reliable augmentation data based on input image data of the scene and improve user orientation in the augmented reality environment. Further, such three dimensional map of the scene may be used to provide image display with focal distance corresponding to actual distance of objects thus, in additional to variation in point of view of images provided to each of the user's eyes, providing a complete three dimensional experience to the user.

Thus the present invention provides a display system, which is generally configured as a head mounted display system, utilizing an optical deflection module provided for directing input light for collection by one or more camera units to provide image collection with a point of view substantially similar to point of view of the user's eyes. This configuration provides for reliable augmented reality experience and increases user orientation in the virtual or augmented reality provided by the system.

The invention claimed is:

1. A system, comprising:
   an eye display unit, comprising:
   at least one camera unit configured for collecting light arriving along a first optical path from a region of interest of a scene and generating image data indicative thereof;
   at least one image forming module configured for receiving imagery data and projecting images of said imagery data along a second optical path towards an eye of a user; and
   an optical deflection module comprising at least one double sided light reflecting optical element being reflecting to light arriving from both sides thereof and having at least one side being 95% or more reflective, the double sided light reflecting optical element being located in front of said eye intersecting said first and second optical paths, and oriented to define said second optical path between the image forming module and the user's eye, and define said first optical path between said at least one camera unit and the scene, such that light propagating along said first optical path from the scene is reflected by said 95% or more reflective side of the double sided light reflecting optical element to said at least one camera unit; thereby providing said at least one camera unit with a point of view substantially similar to line of sight of the user's eye.

2. The system of claim 1, wherein said at least one camera unit is located along said first optical path at an optical plane corresponding to the optical plane of said user eye relative to the scene in the absence of said optical deflection module.

3. The system of claim 1, wherein said at least one camera is located along said first optical path to provide line of sight substantially similar to line of sight of the corresponding user's eye.

4. The system of claim 1, wherein said eye display unit is configured to provide a desired field of view to be collected by said at least one camera unit.

5. The system of claim 1, wherein said eye display unit comprises at least one lens located in said first optical path between the scene and said 95% or more reflective side of the double sided light reflecting optical element.

6. The system of claim 5, wherein said eye display unit further comprises at least one additional lens located in said first optical path between said 95% or more reflective side of the double sided light reflecting optical element and said at least one camera unit.

7. The system of claim 6, wherein the lenses located in said first optical path upstream and downstream of the 95% or more reflective side of the double sided light reflecting optical element form a telephoto lens system.

8. The system of claim 1, wherein said at least one image forming module comprises an eye projection unit configured for projecting structured light indicative of one or more images onto the user's corresponding eye.

9. The system of claim 1, wherein said at least one image forming module comprises an image display unit configured for providing displayed image data.

10. The system of claim 1, further comprising first and second eye display units corresponding with right and left eyes of a user.

11. The system of claim 1, wherein said eye display unit further comprises a control unit, said control unit is configured and operable for receiving image data collected by the at least one camera unit and generating corresponding display image data and transmitting said display image data to the at least one image forming module for providing corresponding imagery to the user.

12. The system of claim 1, wherein said optical deflection module being configured to direct input light such that optical location and line of sight of the at least one camera unit corresponding with optical location and line of sight of the corresponding eye of the user.

13. The system of claim 1, wherein said optical deflection unit provides that location of said at least one camera unit being at an eye equivalent location.

14. The system of claim 1, wherein said at least one display unit being configured to provide seamless image display.

15. The system of claim 1, wherein the optical deflection module comprises at least one reflecting surface configured to provide selected optical manipulation to light reflected therefrom.

16. The system of claim 15, wherein said at least one reflecting surface is configured with at least one of the following: selected surface curvature, diffractive grating, and holographic element.

17. The system of claim 1, wherein said at least one light deflecting module comprises at least one reflecting surface being flat.

* * * * *